Figure 1:
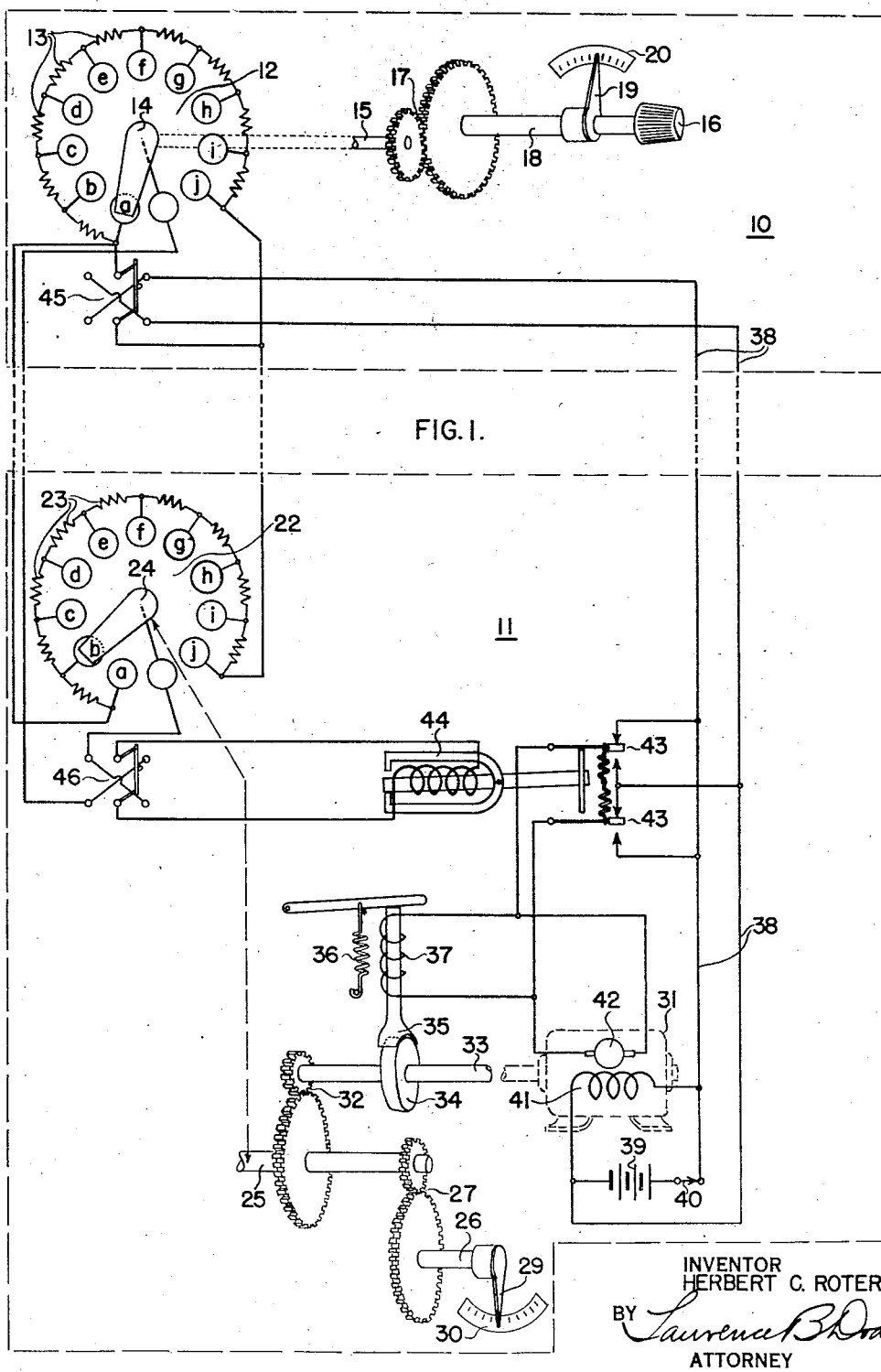

Aug. 25, 1942.　　　H. C. ROTERS　　　2,294,210
POSITION REPEATING SYSTEM
Filed June 23, 1941　　　3 Sheets-Sheet 1

INVENTOR
HERBERT C. ROTERS
BY Laurence B Dodds
ATTORNEY

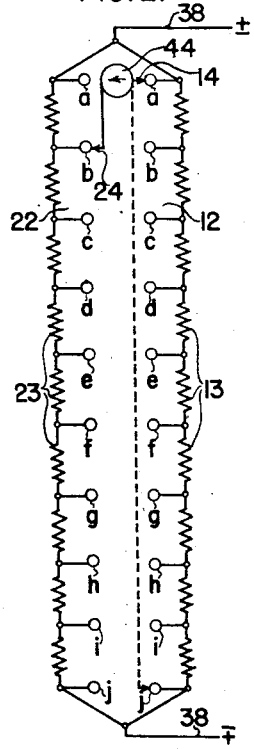
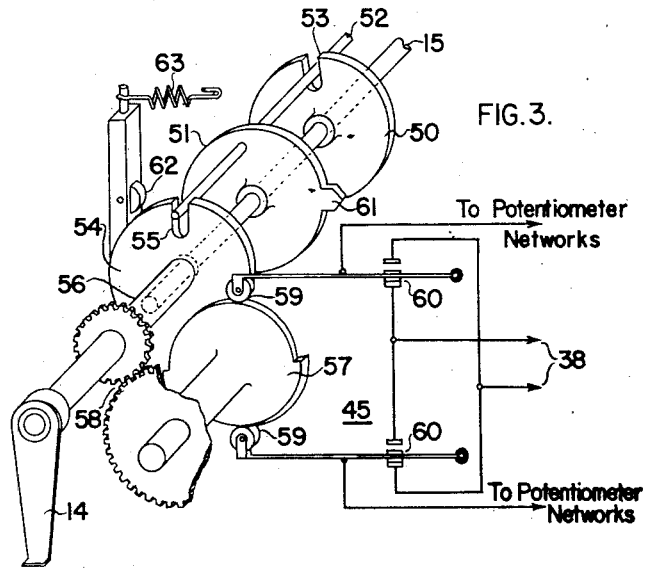
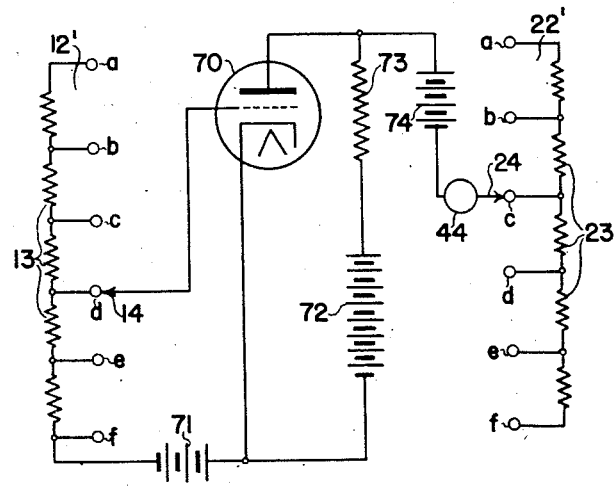

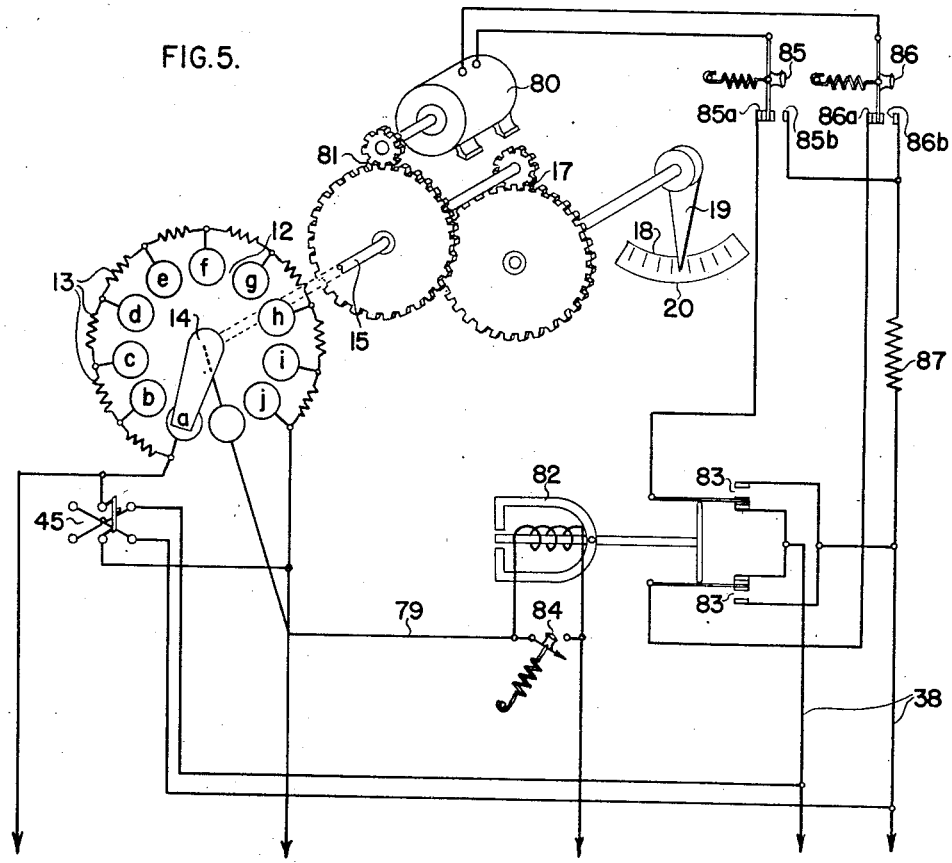

Patented Aug. 25, 1942

2,294,210

UNITED STATES PATENT OFFICE 2,294,210

POSITION REPEATING SYSTEM

Herbert C. Roters, Roslyn, N. Y., assignor to Fairchild Aviation Corporation, a corporation of New York Application June 23, 1941, Serial No. 399,405

13 Claims. (Cl. 172—239)

This invention relates to position repeating systems, that is, systems of the type for causing a secondary controlled member to follow variations in position of a primary controlling member which is usually under the control of an operator or an independent source, the two members usually being positioned at a receiving station and a sending station, respectively, remote from each other. While the invention is of general application, it is particularly suitable in position repeating systems in which the controlled member requires a considerable amount of torque and power.

A wide variety of position repeating systems have been heretofore proposed. Many of these systems have been of the balanced bridge type in which adjustment of the controlling member unbalances the bridge and a relay responsive to such unbalance controls a motor at the receiving station to readjust the balance of the bridge and at the same time adjust the position of the controlled member to correspond to that of the controlling member.

In position repeating systems of the type described, the accuracy of repeating has been undesirably limited by two factors: (1) the amount of unbalance of the bridge, and hence the difference in position of the controlling and controlled members, necessary to actuate the relay; and (2) the variations in the resistance values of the voltage-dividing resistors at the sending and receiving stations making up the bridge, when compared at corresponding positions of the controlling and controlled members.

With respect to the first limitation, if the voltage-divider resistors are tapped resistors, the least movement that will actuate the relay is one tap, making a maximum possible error of one out of the total number of taps used. If a wire-wound voltage divider is used, a maximum error of one out of the total number of turns results. The above is true provided that the voltage unbalance created by the motion of one tap or one turn, as the case may be, is sufficient to operate the relay through the impedance of the bridge. If a high precision position repeating system is to be obtained, the relay must be so designed that a small motion of the controlling member and its associated voltage divider tap will actuate the relay and the control motor. Thus, for a precision of one part in a thousand, a motion across one one-thousandth of the voltage-divider resistance must be sufficient to unbalance the bridge to an extent required to actuate the relay. This order of precision is not ordinarily realizable.

In connection with the second limitation, ordinary commercially available resistors cannot be obtained with an accuracy of resistance value of greater than ±5%. As a result, for a certain angular motion of either bridge tap, the unbalanced resistance may vary as much as ±5% between different voltage-divider resistors. The resultant precision of the system as a whole is limited by the combination of these two individual inaccuracies.

Other types of position repeating systems have been proposed which have avoided the inaccuracies of the bridge type, such as synchronous-type repeaters. Certain of such repeaters have been very precise when no load is connected to the secondary controlled member. However, in this type of position repeating system, no appreciable amount of power or torque is available to operate the secondary controlled member.

It is an object of the present invention, therefore, to provide an improved position repeating system which avoids one or more of the above-mentioned disadvantages of the arrangements of the prior art.

It is another object of the invention to provide an improved position repeating system having a sensitivity which is theoretically unlimited and is practically limited only by economic considerations and, in general, having a sensitivity and an accuracy of a higher order of magnitude than previously obtainable.

It is still a further object of the invention to provide an improved position repeating system of increased sensitivity and at the same time providing any desired amount of power for operation of the secondary controlled member.

In accordance with the invention, the improved position repeating system comprises a primary controlling member, a secondary controlled member, and a potentiometer network including a pair of voltage dividers each having end terminals and a contact adjustable between such terminals either directly or over the voltage divider therebetween. There is a driving connection provided between one of the adjustable contacts and the primary member. There is also an electrical connection between the two contacts including a directional relay and driving means, such as a motor, controlled by such relay and effective to actuate the secondary member and the other of the adjustable contacts to rebalance the potentiometer network upon its unbalance by adjustment of the primary member.

The system also includes means responsive to movement of either of the contacts directly between the end terminals of its respective impedance element for preventing the reversal of current through the relay. This last-named means may comprise a reversing switch associated with each of the contacts, one of the reversing switches being effective to reverse the connection of the current supply circuit to the potentiometer network and the other being effective to reverse the connections of the directional relay.

In accordance with another feature of the invention, there is provided a combined sending and receiving station which may be connected with one or more similar stations to form a complete position repeating system. Such a station comprises a position representing member, a voltage divider adapted to form with a similar voltage divider at another station a potentiometer network, the voltage divider having end terminals and a contact adjustable between the terminals either directly or over the voltage divider therebetween. The station also includes a switching means for selectively connecting the driving means to be controlled by the directional relay when the station is operating as a receiving station, or to be manually controlled when it is operating as a sending station. There is also provided means responsive to the movement of the adjustable contact directly between the end terminals of the voltage divider for preventing the reversal of current through the electrical connection including the directional relay.

For a better understanding of the present invention, together with other and further objects thereof, reference is had to the following description taken in connection with the accompanying drawings and its scope will be pointed out in the appended claims.

Referring now to the drawings, Fig. 1 is a schematic representation of a complete position repeating system embodying the invention; Fig. 2 is an elementary circuit diagram of the potentiometer network of Fig. 1 to aid in the explanation of the invention; Fig. 3 is a perspective view, partly schematic, of an operating mechanism suitable for both the sending and receiving stations; Fig. 4 is a circuit diagram of a modified form of potentiometer network suitable for use where it is desirable to have different voltage levels at the sending and receiving stations; while Fig. 5 is a circuit diagram of a combined sending and receiving station which may be connected to one or more similar stations to form a complete position repeating system embodying the invention.

Referring now more particularly to Fig. 1 of the drawings, there is represented schematically a complete position repeating system embodying the invention and comprising a sending station 10 and a receiving station 11. The sending station includes an impedance device such as a voltage-divider element 12 comprising a plurality of resistor elements 13 connected in series and having a plurality of terminals a—j, inclusive, comprising end terminals and a plurality of electrically equally-spaced intermediate terminals of the voltage divider. These terminals are preferably arranged in the arc of a circle, as shown, and co-operate with a rotatably adjustable contact member 14 mounted on a shaft 15 and actuated by a primary controlling member, such as a knob 16 or a push-button controlled motor, through a driving connection including gearing 17 having a high step-up gear ratio. Disposed on the shaft 18 of the knob 16 is a pointer 19 and co-operating scale 20 for indicating the position of the primary controlling member.

At the receiving station 11 is an impedance device such as a voltage divider 22, similar to voltage divider 12 at the sending station, composed of the same number of resistor elements 23 as the voltage divider 12 and having proportional resistance values and connected in series, and provided with end terminals and intermediate terminals a—j, inclusive. Co-operating with the terminals a—j, inclusive, of voltage divider 22 is a rotatably adjustable contact member 24 connected to a shaft 25, as indicated by the dashed-line connection, the shaft 25, in turn, being connected to a secondary shaft 26 through a driving connection including a reduction gearing 27 having a gear ratio related in a predetermined manner to that of the gearing 17 at the sending station; the gear ratios of gearings 17 and 27 are made equal in case the primary and secondary members are to have equal angular movements. On the shaft 26 is connected a secondary controlled member illustrated as a pointer 29 co-operating with an indicating scale 30, although it will be appreciated that the secondary movable member may well be a power consuming device and that the position repeating system of the invention is particularly suitable to controlling the position of such a device.

The shaft 25 and contact arm 24 are adapted to be actuated by reversible driving means, such as a motor 31, through a reduction gearing 32 and, in turn, the secondary movable member 29 is also driven by the motor 31 through the additional reduction gearing 27. On the shaft 33 of the motor 31 is a brake drum 34 and a co-operating brake 35 adapted normally to be held in engagement with the drum 34 by means of a spring 36 but to be retracted therefrom by a solenoid 37 energized from the motor armature circuit.

The system described also comprises a current supply circuit 38 adapted to be energized from any suitable source, such as a battery 39, through a disconnecting switch 40, the voltage dividers 12 and 22, when connected across the supply circuit, forming a potentiometer network. The motor 31 is provided with a field winding 41 permanently connected across the current supply circuit 38. The motor 31 also has an armature 42 adapted to be controlled or energized from the supply circuit 38 through the contacts 43 of a directional reversing relay 44. In prior art position repeating systems of the type described, the motion of the adjustable contacts has been limited to adjustment within the end terminals of the voltage dividers so that the accuracy of the system was limited by the number of steps in the voltage-divider resistors which, in turn, was limited by the tolerance in the resistor elements of the voltage divider and by the sensitivity of the balance-responsive relay. For example, if it were desired to have an accuracy of one part in a thousand over the entire position repeating range, it was necessary for the adjustable contact to travel over one thousand taps on the potentiometer.

In order to remove this limitation on prior art devices, in accordance with the present invention, each contact is adjustable over its associated voltage divider between its end terminals continuously and repeatedly in either direction over the same series of steps and there is included a reduction gearing from the controlling and controlled members to their associated adjustable contacts. With such a system, if a precision of one part in a thousand is desired for one complete revolution of the controlling and controlled members, this may be procured by providing ten steps in each of the voltage dividers, as illustrated in Fig. 1, and including a 100:1 reduction gear ratio from the controlling or controlled members to the associated contacts.

To this end, the potentiometer network including voltage-dividing networks 12 and 22 is connected across the supply circuit 38 through the double-pole, double-throw reversing switch 45. The directional relay 44 is included in an electrical connection between the normal balance points of the voltage dividers 12, 22 of the potentiometer network, that is, to the adjustable contacts 14 and 24, through a double-pole, double-throw reversing switch 46. While the resistors 13 and 23 of the voltage dividers 12 and 22 may all have equal resistance values, it is preferable so to proportion the resistors of each of the voltage dividers that the power input, rather than the input voltage, to the relay 44 per step difference in position of the contact arms 14 and 24 is maintained constant over the entire range of their adjustment. The switch 45 is adapted to be thrown from one position to the other to reverse the connection from the supply circuit 38 to the voltage-dividing networks 12 and 22 in response to movement of its associated contact member directly from its end terminal a to its end terminal j, and vice versa, by any suitable apparatus, one type of which is described in more detail hereinafter. Similarly, the reversing switch 46 is adapted to be operated from one position to the other to reverse the connections of the directional relay 44 in response to movement of its associated contact 24 directly from its end terminal a to its end terminal j, and vice versa. The switches 45 and 46 together comprise means responsive to the movement of either of the contacts 14, 24 directly between the end terminals of its respective impedance means for preventing reversal of current through the reversing relay 44.

The operation of the position repeating system described above may be better understood by reference to the equivalent simplified diagram of the potentiometer network, per se, of Fig. 2, in which elements corresponds to those of Fig. 1 are given the same reference characters. It may be assumed, for example, that the primary controlling element 16 is adjusted in such a direction that the contact 14 of potentiometer 12 has moved in a counterclockwise direction from contact b to contact a and that the contact 24 of the voltage divider 22 is following from the contact b to the contact a, as represented by Fig. 2. It may also be assumed that the motion of the contact arm 14 is continuing in a counterclockwise direction from the terminal a to the terminal j. Before the contact 14 leaves the terminal a and while the contact 24 of potentiometer 22 is on contact b, and assuming the upper terminal of the supply circuit 38 to be positive, it will be seen that the potentiometer network is unbalanced in a direction such that current flows through the directional relay 44 in the direction of the arrow. Therefore, as long as the contact arm 14 continues rotating in a counterclockwise direction, the unbalance current of the potentiometer network must continue to flow through the relay 44 in the same direction.

However, when the contact 14 shifts from the terminal a to the terminal j, as indicated by the dotted-line connection of Fig. 2, if there were no other changes in the circuit, it is seen that the polarity of the unbalanced voltage would, for the time being, be reversed, thereby reversing the current through the directional relay 44. Under these conditions, relay 44 would operate to reverse the energization and the direction of rotation of the motor 31 so that the contact 24 of the voltage divider 22 and the associated secondary controlled member would be adjusted in the wrong direction. To prevent such an occurrence, as stated above, the reversing switch 45 is adapted to be operated to reverse the polarity of energization of both the voltage-dividing networks 12 and 22 from supply circuit 38 simultaneously with the movement of the contact 14 from the terminal a to the terminal j. It will be seen from Fig. 2 that the effect of this reversal is to make the upper supply line 38 negative and the lower one positive and to maintain the polarity of the unbalance potential of the potentiometer network unchanged. Under these conditions, the motor 31 continues to operate in the same direction and cause the secondary controlled member 29 to follow the primary controlling member 19 and to cause the contact 24 to follow the adjustment of the contact 14 to tend to maintain the potentiometer network substantially in balance. Obviously, a reverse process takes place upon the movement of the contact 14 directly from the terminal j to the terminal a in the opposite direction, so that irrespective of the movement of the contact 14 directly between the end terminals a and j, which would normally tend to reverse the direction of current through the directional relay 44, this relay current is maintained in the same direction to maintain the rotation of the motor 31 continuously in the proper direction.

In order similarly to provide for the reversal of the unbalance current through the directional relay 44 due to movement of the contact 24 of voltage divider 22 directly between its end terminals a and j, the reversing switch 46 is connected to be operated simultaneously with such movement of contact 24 to reverse the connections to the relay 44 and thus maintain the direction of relay current constant for a given direction of rotation of the contact members 14 and 24. When the contact members 14 and 24 are rotated in the opposite direction, the direction of lag of the contact 24 with respect to contact 14 is in the opposite direction so that the relay current 44 is reversed to change the reversing contacts 43 to reverse the direction of rotation of the motor 31.

In order to prevent or minimize over-running of the motor 31 when the potentiometer network has been restored to balance in normal operation, there is provided the spring-operated brake 35. During operation of the motor, the brake 35 is retracted by the solenoid 37 connected directly to the motor armature circuit but, in response to deenergization of the motor by operation of the directional relay 44 to its neutral position upon balancing of the potentiometer network, the brake 35 is actuated by the spring 36 to brake the motor, rapidly to decelerate it to rest. It will also be noted that, when the directional relay 44 operates to its neutral position in response to balancing of the potentiometer network, the armature 42 of the motor 31 is short-circuited through the contacts 43, thus dynamically braking the motor. In certain instances this dynamic braking is sufficient without the provision of the additional brake 35 and it may be omitted.

While any suitable mechanism may be provided for operating the reversing switches 45 and 46 simultaneously with the movement of the adjustable contacts 14 and 24 directly between their associated end terminals $a$ and $j$, it is desirable to provide some mechanism such that, during the transition of the contacts between these end terminals, there is a snap action to prevent any substantial interruption of current through the directional relay 44 and the driving motor 31 which might permit the system to come to rest in a dead-center position. One suitable switch-operating mechanism is illustrated in Fig. 3 which illustrates also a mechanism for driving the adjustable contact 14 of the voltage divider 12 from the shaft 15. This mechanism comprises a disc 50 fixed to the shaft 15 and connected to drive a disc 51 which is loose on the shaft 15 through a pin 52 engaging a slot 53 in disc 50. The disc 51, in turn, drives a disc 54 by engagement of the pin 52 in a slot 55 in the disc 54. The slots 53 and 55 are somewhat wider than the pin 52 so that there is a limited lost motion in the driving connection between the disc 51 and the discs 50 and 54. The disc 54 is mounted on a hollow shaft or sleeve 56 revolving on the shaft 15 but coupled thereto only through the driving pin 52. The shaft 56 drives the contact 14 directly and, as shown, also drives a cam 57 through a 1:2 reduction gearing 58. The cam 57 co-operates with two roller followers 59 which operate the reversing switch contacts 60, the elements 57, 59, and 60 collectively comprising the reversing switch 45 of Fig. 1. A projection 61 extends from the disc 51 and co-operates with a roller 62 biased into engagement therewith by a spring 63.

In the operation of the reversing switch mechanism described, due to the lost motion of the driving pin 52 and the driven plate 54, the contact 14 lags behind the extension 61 in either direction of rotation so that it can be arranged to be on the crest of the roller 62 when the contact 14 is either on terminal $a$ or terminal $j$. Further slight motion of the projection 61 by the driving disc 50 in either direction causes the roller 62 to drive the extension 61 by the spring 63 so that the driven plate 54 advances to the position corresponding to engagement of the associated contact arm with the succeeding terminal $a$ or $j$ independently of the driivng disc 50. The forward motion of the driven disc 54 under the influence of the spring 63 is made sufficient to carry the contact freely from either terminal $a$ to terminal $j$, or vice versa. In this way, the contact 14 is prevented from stopping midway between the terminals $a$ and $j$. However, this lost motion between discs 50 and 54 should be made as small as is consistent with obtaining the snap-action described since it represents an inaccuracy in the repeating system. The transition points of the cam 57 are determined so that the reversing switches 60 of the switch mechanism 45 are operated as nearly simultaneously as possible, whereby the whole mechanism is the equivalent of the double-pole, double-throw switch. The spacing of the transition points of the cam 57 is such that the polarity of the connections of the supply circuit 38 to the potentiometer network is reversed each time contact 14 passes directly between the end terminals $a$ and $j$.

A mechanism similar to that of Fig. 2 may be used for the double-pole, double-throw reversing switch 46 operated simultaneously with adjustment of contact 24 of the voltage divider 22 directly between its end terminals $a$ and $j$, except that in this instance the shaft 15 is driven by the motor 31.

With the system described above, it is possible continuously to rotate the primary controlling member 16 and contact 14 indefinitely in either direction and have the contact 24 and the secondary controlled element 29 repeat the position of the primary member continuously, provided that at no time the contact 14 gets more than one revolution less one tap ahead of the contact 24. Inasmuch as the motor 31 drives the contact 24 at some fixed constant speed, a phase displacement of more than such limiting amount may be avoided either by making this speed sufficiently great that it will be in excess of any possible manual adjustment of the primary controlling element 16, or by substituting for the manual knob 16 a push-button controlled driving motor for the shaft 18 having a maximum speed such that the speed of revolution of the contact 14 is always less than the maximum speed of the contact 24.

While the system described above has been illustrated as a direct current system, it will be understood that it is also applicable to an alternating current system, in which case the directional relay 44 will be a polarity or phase-responsive alternating current directional relay.

In installations in which it is desired to have a supply circuit of different voltage level at the sending station 10 and the receiving station 11, the modified potentiometer network shown partially in Fig. 4 may be used in the arrangement of Fig. 1. In this arrangement the voltage divider 12' is similar to voltage divider 12 of Fig. 1, but shown with a reduced number of taps or terminals. The voltage divider 22' adapted to be located at the receiving station is similar to the voltage divider 22 of Fig. 1 to a similar extent. The adjustable contact 14 of the voltage divider 12' and one end terminal is connected to the input circuit of a direct current vacuum-tube amplifier 70 through a suitable grid-bias battery 71. The anode circuit of the tube 70 is energized from a suitable source, such as a battery 72, through a load resistor 73. The directional relay 44 is connected from the output terminal of the amplifier circuit to the adjustable contact 24 of the voltage divider 22' through a biasing battery 74. In operation the polarity of the voltages impressed upon the voltage-dividing networks 12' and 22' will be reversed simultaneously as in the arrangement of Fig. 1.

The operation of the arrangement of Fig. 4 is essentially similar to that of Fig. 1, the directional relay 44 balancing the output voltage of the vacuum-tube amplifier, which is an amplified multiple of the selected portion of the voltage derived from the voltage divider 12', against a selected portion of the voltage across the voltage divider 22'. Since the directional relay is to balance only the portion of the voltage of the output circuit of the amplifier 70 corresponding to variations in its input voltage, there is included a bias battery 74 in series with the relay 44 to balance out the minimum output voltage of the amplifier.

In Fig. 5 of the drawings there is represented, partially schematically, a combined sending and receiving station adapted to co-operate with one or more additional similar stations to form a complete position repeating system. In this figure the voltage-divider network 12 is identical to that of Fig. 1. The contact 14 of the voltage divider 12 is adapted to be driven from a motor 80 through a reduction gearing 81. Similarly, the position representing member 19, which may be either a primary controlling member or a secondary controlled member in accordance with whether the station is operating as a sending station or receiving station, is driven from the motor 80 through the reduction gearing 81 and the additional reduction gearing 17. Connected to the contact 14 of the voltage divider 12 is an electrical connection 79 which includes the energizing winding of a directional relay 82 similar to the relay 44 of Fig. 1. The connection 79 is adapted to be connected to a corresponding contact at another similar station.

The motor 80 is energized from the supply circuit 38 through the reversing contacts 83 of the directional relay 82 and a pair of two-position switches 85, 86 normally spring-biased to engage contacts 85a and 86a, respectively, but selectively manually operable to engage contacts 85b and 86b, respectively. The contacts 85b and 86b are connected together and to one side of the supply circuit 38 through a resistor 87. A switch 84 normally spring-biased to open position is connected across the winding of the relay 82 to render it inoperative.

In considering the operation of the combined sending and receiving station of Fig. 5, it will be assumed that the switches 84, 85, and 86 are in their illustrated positions to which they are normally biased. Under these conditions, the system is substantially identical to the receiving station of the system of Fig. 1 and operates in an entirely similar manner. If now it is desired to utilize the station of Fig. 5, as a sending station, the switch 84 is closed to render the directional relay 82 inoperative. Under these conditions, it will be noted that the circuit of motor 80 is short-circuited through the contacts 83 of the relay 82 and connected to one side of the supply circuit 38. Operation of switch 85 to close its contact 85b is effective to energize the motor 80 with one polarity to actuate the position representing member 19 and the contact 14 of the voltage divider 12 to unbalance the potentiometer network of the system comprising the voltage divider 12 and the corresponding element of another station. Under these conditions, it will be seen that the operation of the station is entirely manually controlled by the switch 85. Similarly, operation of the switch 86 to close its contact 86b is effective to energize the motor 80 with opposite polarity to adjust the position representing member 19 and the contact 14 in the opposite sense. In either case, the other similar station connected to the station described will operate in the manner described above to follow or repeat the adjusted position of the position representing member 19. During this operation, the resistor 87 is in circuit with motor 80 and is effective to reduce the operating voltage so that the motor 80 operates at a lower speed than the corresponding motor at the similar station, thus avoiding any possibility that the motor at the sending station will get ahead of the corresponding motor at the receiving station, due to any slight differences in characteristics of the two stations.

When two or more stations of the type of Fig. 5 are connected to form a position repeating system, it will be seen that they are normally all connected as receivers. In this case, the system will still reach a condition of balance in case the directional relays are so connected that the current through the one at the sending station in series with those at the receiving stations causes the driving motors at the sending and receiving stations to rotate in opposite directions. This causes the arm 14 of the voltage divider of the sending station and the corresponding arms of the receiving stations to approach each other, in the event that the sending switches are released manually to their biased positions before the system has come into balance.

In the several embodiments of the invention described, the principal limit on the speed of operation of the system is the time delay involved in the relay operation and the time required to stop the motor. In one practical embodiment of a position repeating system, in accordance with the species of the invention illustrated in Fig. 1, each of the voltage dividers 12 and 22 had ten electrically-spaced contacts while there was a 100:1 reduction gearing interposed between the adjustable contact elements 14 and 24 and the primary and secondary members, respectively. The motor 31 was rated at a torque of 0.8 oz.-in. at 5,000 R. P. M. and was connected to the shaft 25 through a 100:1 reduction gearing. As a result, the speed of rotation of the shaft 26 and the secondary controlled member 29 was 0.5 R. P. M. and there was available at the secondary controlled member an output torque of 8,000 oz.-in. less the gear losses. The maximum displacement error between the primary controlling member and the secondary controlled member was ±½ degree and included the maximum possible error in the position of the contact members 14 and 24, one-half the mean distance between the terminals which was 18 degrees, plus a maximum error of 8 degrees in backlash in the gearing.

While in each of the illustrated embodiments of the invention only a single receiving station with a single secondary controlled member is shown and described, it is to be understood that a plurality of receiving stations each including a secondary controlled member may be controlled from a single sending station merely by connecting the electrical control circuits of the several receiving stations in parallel to the electrical circuits from the sending station.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A position repeating system comprising a primary controlling member, a secondary controlled member, a potentiometer network including a pair of voltage dividers each having end terminals and a single contact adjustable between said terminals either directly or over the voltage divider therebetween, a driving connection between one of said adjustable contacts and said primary member, a single electrical balance connection between said contacts including a directional relay, driving means controlled by said relay and effective to actuate said secondary member and the other of said adjustable contacts to rebalance said potentiometer network upon its unbalance by adjustment of said primary member, and means responsive to movement of either of said contacts directly between the end terminals of its respective impedance element for preventing the reversal of current through said balance connection.

2. A position repeating system comprising a primary controlling member, a secondary controlled member, a current supply circuit, a potentiometer network connected to said supply circuit and including a pair of impedance devices each having end terminals and a single contact adjustable between said terminals either directly or over the impedance device therebetween, a driving connection between one of said adjustable contacts and said primary member, a single electrical balance connection between said contacts including a directional relay, driving means controlled by said relay and effective to actuate said secondary member and the other of said adjustable contacts to rebalance said potentiometer network upon its unbalance by adjustment of said primary member, and means responsive to movement of either of said contacts directly between the end terminals of its respective impedance element for preventing the reversal of current through said balance connection.

3. A position repeating system comprising a primary controlling member, a secondary controlled member, a potentiometer network including a pair of voltage dividers each having end terminals and a single contact adjustable over said voltage divider between said terminals continuously and repeatedly in the same direction, a driving connection between one of said adjustable contacts and said primary member, a single electrical balance connection between said contacts including a directional relay, driving means controlled by said relay and effective to actuate said secondary member and the other of said adjustable contacts to rebalance said potentiometer network upon its unbalance by adjustment of said primary member, and means responsive to movement of either of said contacts directly between the end terminals of its respective impedance element for preventing the reversal of current through said balance connection.

4. A position repeating system comprising a primary controlling member, a secondary controlled member, a potentiometer network including a pair of voltage dividers each having a plurality of electrically-spaced terminals and a single contact adjustable over said terminals continuously and repeatedly in the same direction, a driving connection between one of said adjustable contacts and said primary member, a single electrical balance connection between said contacts including a directional relay, driving means controlled by said relay and effective to actuate said secondary member and the other of said adjustable contacts to rebalance said potentiometer network upon its unbalance by adjustment of said primary member, and means responsive to movement of either of said contacts directly between the end terminals of its respective impedance element for preventing the reversal of current through said balance connection.

5. A position repeating system comprising a primary controlling member, a secondary controlled member, a potentiometer network including a pair of voltage dividers comprising the same number of resistors having proportional resistance values and terminals therefor and a single contact adjustable over said terminals of each of said voltage dividers continuously and repeatedly in the same direction, a driving connection between one of said adjustable contacts and said primary member, a single electrical balance connection between said contacts including a directional relay, driving means controlled by said relay and effective to actuate said secondary member and the other of said adjustable contacts to rebalance said potentiometer network upon its unbalance by adjustment of said primary member, and means responsive to movement of either of said contacts directly between the end terminals of its respective impedance element for preventing the reversal of current through said balance connection.

6. A position repeating system comprising a primary controlling member, a secondary controlled member, a current supply circuit, a potentiometer network connected to said supply circuit and including a pair of impedance devices each having end terminals and a single contact adjustable between said terminals either directly or over the impedance device therebetween, a driving connection between one of said adjustable contacts and said primary member, a single electrical balance connection between said contacts including a directional relay, driving means controlled by said relay and effective to actuate said secondary member and the other of said adjustable contacts to rebalance said potentiometer network upon its unbalance by adjustment of said primary member, switch means responsive to the movement of one of said contacts directly between the end terminals of its respective impedance device for reversing the connections between said supply circuit and said potentiometer network, and switch means responsive to movement of the other of said contacts directly between the end terminals of its respective impedance device for reversing the connections to said relay.

7. A position repeating system comprising a primary controlling member, a secondary controlled member, a current supply circuit, a potentiometer network connected to said supply circuit and including a pair of impedance devices each having end terminals and a single contact adjustable between said terminals either directly or over the impedance device therebetween, a driving connection between one of said adjustable contacts and said primary member, a single electrical balance connection between said contacts including a directional relay, driving means controlled by said relay and effective to actuate said secondary member and the other of said adjustable contacts to rebalance said potentiometer network upon its unbalance by adjustment of said primary member, switch means responsive to the movement of said contact associated with said primary member directly between the end terminals of its respective impedance device for reversing the connections between said supply circuit and said potentiometer network, and switch means responsive to movement of said contact associated with said secondary member directly between the end terminals of its respective impedance device for reversing the connections to said relay.

8. A position repeating system comprising a primary controlling member, a secondary controlled member, a potentiometer network including a pair of voltage dividers each having end terminals and a single contact adjustable in either direction between said terminals either directly or over the voltage divider therebetween, a driving connection between one of said adjustable contacts and said primary member, a single electrical balance connection between said contacts including a directional reversing relay, reversible driving means controlled by said relay and effective to actuate said secondary member and the other of said adjustable contacts to rebalance said potentiometer network upon its unbalance by adjustment of said primary member, and means responsive to movement of either of said contacts directly between the end terminals of its respective impedance element for preventing the reversal of current through said balance connection.

9. A position repeating system comprising a sending station including a primary controlling member, a receiving station including a secondary controlled member, a potentiometer network including a pair of voltage dividers one at said sending station and one at said receiving station and each having end terminals and a single contact adjustable between said terminals either directly or over the voltage divider therebetween, a driving connection between one of said adjustable contacts and said primary member, a single electrical balance connection between said contacts including a directional relay, driving means at said receiving station controlled by said relay and effective to actuate said secondary member and the other of said adjustable contacts to rebalance said potentiometer network upon its unbalance by adjustment of said primary member, and means responsive to movement of either of said contacts directly between the end terminals of its respective impedance element for preventing the reversal of current through said balance connection.

10. A position repeating system comprising a primary controlling member, a secondary controlled member, a potentiometer network including a pair of voltage dividers each having end terminals and a single contact adjustable between said terminals either directly or over the voltage divider therebetween, a driving connection between one of said adjustable contacts and said primary member, a single electrical balance connection between said contacts including a directional relay, a motor energized through said relay and effective to actuate said secondary member and the other of said adjustable contacts to rebalance said potentiometer network upon its unbalance by adjustment of said primary member, means responsive to movement of either of said contacts directly between the end terminals of its respective impedance element for preventing the reversal of current through said balance connection, and means responsive to deenergization of said motor upon balancing of said potentiometer network for braking said motor rapidly to decelerate it to rest.

11. A position repeating system comprising a primary controlling member, a secondary controlled member, a potentiometer network including a pair of voltage dividers each having end terminals and a single contact adjustable between said terminals either directly or over the voltage divider therebetween, a driving connection between one of said adjustable contacts and said primary member, a single electrical balance connection between said contacts including a directional relay, a motor having an armature energized through said relay and effective to actuate said secondary member and the other of said adjustable contacts to rebalance said potentiometer network upon its unbalance by adjustment of said primary member, means responsive to movement of either of said contacts directly between the end terminals of its respective impedance element for preventing the reversal of current through said balance connection, and means responsive to deenergization of said motor upon balancing of said potentiometer network for short-circuiting said armature to provide dynamic braking.

12. A position repeating system comprising a primary controlling member, a secondary controlled member, a potentiometer network including a pair of voltage dividers each having end terminals and a single contact adjustable between said terminals either directly or over the voltage divider therebetween, a driving connection including reduction gearing between one of said adjustable contacts and said primary member, a single electrical balance connection between said contacts including a directional relay, driving means including reduction gearing having a gear ratio of a predetermined relation to that of said first-named gearing controlled by said relay and effective to actuate said secondary member and the other of said adjustable contacts to rebalance said potentiometer network upon its unbalance by adjustment of said primary member, and means responsive to movement of either of said contacts directly between the end terminals of its respective impedance element for preventing the reversal of current through said balance connection.

13. In a position repeating system, a combined sending and receiving station comprising, a position representing member, a voltage divider adapted to form with a similar voltage divider at another station a potentiometer network, said voltage divider having end terminals and a contact adjustable between said terminals either directly or over the voltage divider therebetween, driving means for said contact and said member, an electrical connection to said contact including a directional relay and adapted to be connected to a corresponding contact at another similar station, switching means for selectively connecting said driving means to be controlled by said relay when said station is operating as a receiving station or to be manually controlled when operating as a sending station, and means responsive to the movement of said contact directly between said end terminals for preventing the reversal of current through said electrical connection including said relay.

HERBERT C. ROTERS.